US011718204B2

(12) United States Patent
Carroll et al.

(10) Patent No.: US 11,718,204 B2
(45) Date of Patent: Aug. 8, 2023

(54) ANTI-CHUCK MECHANISM FOR SEAT TRACK ASSEMBLY

(71) Applicant: Camaco, LLC, Farmington Hills, MI (US)

(72) Inventors: Jeff Carroll, Farmington Hills, MI (US); Sanjay Vakil, Farmington Hills, MI (US); Mohammad Fazli, Farmington Hills, MI (US); Yang Cao, Farmington Hills, MI (US); Harish Bijwe, Farmington Hills, MI (US)

(73) Assignee: CAMACO, LLC., Farmington Hills, MI (US)

( * ) Notice: Subject to any disclaimer, the term of this patent is extended or adjusted under 35 U.S.C. 154(b) by 0 days.

(21) Appl. No.: 17/686,874

(22) Filed: Mar. 4, 2022

(65) Prior Publication Data
US 2022/0281360 A1    Sep. 8, 2022

Related U.S. Application Data

(60) Provisional application No. 63/157,326, filed on Mar. 5, 2021.

(51) Int. Cl.
*B60N 2/07* (2006.01)
*B60N 2/08* (2006.01)

(52) U.S. Cl.
CPC ......... *B60N 2/0818* (2013.01); *B60N 2/0705* (2013.01); *B60N 2/0715* (2013.01); *B60N 2/0843* (2013.01)

(58) Field of Classification Search
CPC ...... B60N 2/07; B60N 2/0705; B60N 2/7015; B60N 2/0812; B60N 2/0818;
(Continued)

(56) References Cited

U.S. PATENT DOCUMENTS 5,286,076 A    2/1994    Devoss et al.
5,918,846 A *  7/1999    Garrido ............... B60N 2/123
                                            248/424
(Continued)

FOREIGN PATENT DOCUMENTS

EP    0 944 38 B1    11/1983
EP    3 733 445      11/2020
(Continued)

OTHER PUBLICATIONS

International Search Report on PCT/US2022/018891 dated Jun. 2, 2022 (10 pages).

*Primary Examiner* — Jonathan Liu
*Assistant Examiner* — Guang H Guan
(74) *Attorney, Agent, or Firm* — Foley & Lardner LLP

(57) ABSTRACT

A track assembly includes a first track, a second track, and a latch assembly. The first track includes a plurality of first apertures. The second track includes a plurality of second apertures. The latch assembly includes a latch plate and an anti-chuck component. The latch plate includes a plurality of first teeth that selectively extend through the plurality of first apertures and through a subset of the plurality of second apertures. A gap is present between at least one of the plurality of first teeth and a side of a respective one of the plurality of first apertures when the latch plate is in the engaged position. The anti-chuck component is coupled to the latch plate. The latch plate includes one or more second teeth that engage at least one of the plurality of first apertures to close the gap.

19 Claims, 15 Drawing Sheets

(58) Field of Classification Search
CPC .. B60N 2/0831; B60N 2/0837; B60N 2/0843; B60N 2/085; B60N 2/0856; B60N 2/0881; B60N 2/0893; B60N 2/0715
USPC .......................................... 248/424, 429, 430
See application file for complete search history.

(56) References Cited

U.S. PATENT DOCUMENTS

| | | | |
|---|---|---|---|
| 6,322,036 B1 | 11/2001 | Tame et al. | |
| 6,354,553 B1 | 3/2002 | Lagerweij et al. | |
| 6,637,712 B1 | 10/2003 | Lagerweij | |
| 6,688,574 B2 | 2/2004 | Okazaki et al. | |
| 6,869,057 B2 | 3/2005 | Matsumoto et al. | |
| 6,892,995 B2 | 5/2005 | Tame et al. | |
| 6,926,443 B2 | 8/2005 | Niimi et al. | |
| 6,953,178 B2 | 10/2005 | Yamada et al. | |
| 6,981,681 B2 | 1/2006 | Matsumoto | |
| 7,000,880 B2 * | 2/2006 | Jaudouin | B60N 2/08 297/344.11 |
| 7,025,419 B2 | 4/2006 | Sasaki et al. | |
| 7,147,195 B2 | 12/2006 | Danjo et al. | |
| 7,431,256 B2 * | 10/2008 | Yamada | B60N 2/0825 297/344.11 |
| 7,506,856 B2 | 3/2009 | Ikegaya et al. | |
| 7,523,913 B2 | 4/2009 | Mizuno et al. | |
| 7,614,597 B2 | 11/2009 | Matsumoto et al. | |
| 7,661,646 B2 | 2/2010 | Weber | |
| 7,665,791 B2 | 2/2010 | Kojima et al. | |
| 7,735,798 B2 | 6/2010 | Kojima | |
| 7,758,008 B2 | 7/2010 | Kojima et al. | |
| 7,780,138 B1 | 8/2010 | Lee et al. | |
| 7,905,461 B2 | 3/2011 | Noffz | |
| 8,029,063 B2 | 10/2011 | Kazyak et al. | |
| 8,033,520 B2 | 10/2011 | Fujieda et al. | |
| 8,049,491 B2 | 11/2011 | Nishide | |
| 8,215,602 B2 * | 7/2012 | Walter | B60N 2/0818 296/65.13 |
| 8,308,120 B2 | 11/2012 | Zacharias et al. | |
| 8,550,420 B2 | 10/2013 | Wojatzki et al. | |
| 8,573,698 B2 | 11/2013 | Wojatzki et al. | |
| 8,827,229 B2 | 9/2014 | Wakayama et al. | |
| 8,870,147 B2 | 10/2014 | Simms et al. | |
| 9,067,514 B2 * | 6/2015 | Oh | B60N 2/0818 |
| 9,108,532 B2 | 8/2015 | Seille | |
| 9,120,400 B2 | 9/2015 | Ruthmann et al. | |
| 9,150,124 B2 | 10/2015 | Becker et al. | |
| 9,162,596 B2 | 10/2015 | Kato et al. | |
| 9,227,528 B2 | 1/2016 | Yamada et al. | |
| 9,393,883 B2 * | 7/2016 | Wojatzki | B60N 2/0818 |
| 9,415,701 B2 | 8/2016 | Wrong et al. | |
| 9,566,878 B2 | 2/2017 | Couasnon | |
| 9,758,062 B2 | 9/2017 | Couasnon | |
| 10,131,250 B2 | 11/2018 | Flick | |
| 10,195,963 B2 * | 2/2019 | Flick | B60N 2/0715 |
| 10,744,908 B2 | 8/2020 | Laumeier et al. | |
| 10,882,425 B2 | 1/2021 | Emrich et al. | |
| 10,933,772 B2 | 3/2021 | Sprenger | |
| 11,267,370 B2 * | 3/2022 | Flick | B21D 53/88 |
| 2003/0209930 A1 | 11/2003 | Horsfield et al. | |
| 2009/0289485 A1 | 11/2009 | Walter et al. | |
| 2011/0163217 A1 | 7/2011 | Kimura et al. | |
| 2011/0193389 A1 | 8/2011 | Wojatzki et al. | |
| 2012/0001049 A1 | 1/2012 | Selbold et al. | |
| 2012/0006963 A1 | 1/2012 | Yoshida et al. | |
| 2013/0112833 A1 | 5/2013 | Kim | |
| 2019/0225116 A1 | 7/2019 | Zhang et al. | |
| 2020/0001745 A1 | 1/2020 | Shimizu | |
| 2020/0009995 A1 | 1/2020 | Sonar | |
| 2020/0331364 A1 | 10/2020 | Hsi et al. | |
| 2021/0078454 A1 | 3/2021 | Speck | |
| 2022/0281358 A1 * | 9/2022 | Carroll | B60N 2/0818 |
| 2022/0281360 A1 * | 9/2022 | Carroll | B60N 2/0831 |

FOREIGN PATENT DOCUMENTS

| | | |
|---|---|---|
| WO | WO-2008/093918 | 8/2008 |
| WO | WO-2011/085768 | 7/2011 |
| WO | WO-2017/094963 | 6/2017 |

* cited by examiner

ANTI-CHUCK MECHANISM FOR SEAT TRACK ASSEMBLY

CROSS-REFERENCE TO RELATED PATENT APPLICATIONS

This application claims the benefit of and priority to U.S. Provisional Patent Application No. 63/157,326, filed Mar. 5, 2021, which is incorporated herein by reference in its entirety.

BACKGROUND

A typical vehicle includes a cabin that has a seat assembly that accommodates and supports an occupant. The seat assembly includes a seat and a track assembly that secures the seat to a floor of the cabin. The track assembly may facilitate repositioning the seat between a plurality of positions (i.e., translate the seat forward or backward).

SUMMARY

One embodiment relates to a track assembly for mounting a seat within a vehicle. The track assembly includes a first track having a plurality of first apertures, a second track having a plurality of second apertures, and a latch assembly. The latch assembly includes a latch plate and an anti-chuck component coupled to the latch plate. The latch plate is repositionable between an engaged position and a disengaged position. The latch plate includes a plurality of first teeth that selectively extend through the plurality of first apertures and through a subset of the plurality of second apertures when the latch plate is in the engaged position. A gap is present between at least one of the plurality of first teeth and a side of a respective one of the plurality of first apertures when the latch plate is in the engaged position. The anti-chuck component includes a second tooth that engages a portion of the side of the respective one of the plurality of first apertures to close the gap when the latch plate is in the engaged position.

Another embodiment relates to a vehicle seat. The vehicle seat includes a seat and a track assembly configured to mount the seat to a surface of a vehicle. The track assembly includes a first track having a plurality of first apertures, a second track having a plurality of second apertures, and a latch assembly. The latch assembly includes a latch plate and an anti-chuck component coupled to the latch plate. The latch plate is repositionable between an engaged position and a disengaged position. The latch plate includes a plurality of first teeth that selectively extend through the plurality of first apertures and through a subset of the plurality of second apertures when the latch plate is in the engaged position. A gap is present between at least one of the plurality of first teeth and a side of a respective one of the plurality of first apertures when the latch plate is in the engaged position. The anti-chuck component includes a second tooth that engages a portion of the side of the respective one of the plurality of first apertures to close the gap when the latch plate is in the engaged position.

Still another embodiment relates to a track assembly for mounting a seat within a vehicle. The track assembly includes an upper rail, a lower rail, and a latch assembly. The upper rail has a top wall, a first upper sidewall extending downward from a first side of the top wall and terminating with a first lip, a second upper sidewall extending downward from an opposing second side of the top wall and terminating with a second lip, and a flange extending from the first upper sidewall. The first upper sidewall defines (i) a latch slot and (ii) a plurality of first apertures positioned beneath the latch slot. The flange is positioned proximate the latch assembly slot. The lower rail has a bottom wall, a first lower sidewall extending upward from a first side of the bottom wall and terminating with a third lip, and a second lower sidewall extending upward from an opposing second side of the bottom wall and terminating with a fourth lip. The third lip defines a plurality of second apertures. The third lip and the fourth lip engage with the first lip and the second lip to slidably couple the lower rail and the upper rail together. The latch assembly is coupled to the flange and extends through the latch slot. The latch assembly includes a latch plate and an anti-chuck plate coupled to the latch plate. The latch plate is repositionable between an engaged position and a disengaged position. The latch plate includes a plurality of latch teeth that selectively extend through the plurality of first apertures of the first upper sidewall and through a subset of the plurality of second apertures of the third lip when the latch plate is in the engaged position to restrict relative movement between the upper rail and the lower rail. The anti-chuck plate includes a first anti-chuck tooth and a second anti-chuck tooth. The first anti-chuck tooth (i) is disposed along a first latch tooth of the plurality of latch teeth, (ii) extends past a first edge of the first latch tooth, and (iii) does not extend past an opposing second edge of the first latch tooth. The second anti-chuck tooth (i) is disposed along a second latch tooth of the plurality of latch teeth, (ii) extends past the opposing second edge of the second latch tooth, and (iii) does not extend past the first edge of the second latch tooth.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a seat track assembly of the present disclosure includes a latch assembly that facilitates locking a seat in a desired position. Seat track assemblies typically include a variety of components. In order for these components to interact with one another, the components have to be designed with certain clearances to permit engagement. However, such clearances can lead to relative movement or "chuck" between the components (e.g., during loading conditions, acceleration, deceleration, etc.). The latch assembly of the present disclosure not only facilitates securing the seat in the desired position, but also provides an anti-chuck function that eliminates minor movement or "chuck" between components of the track assembly.

Figure 1:
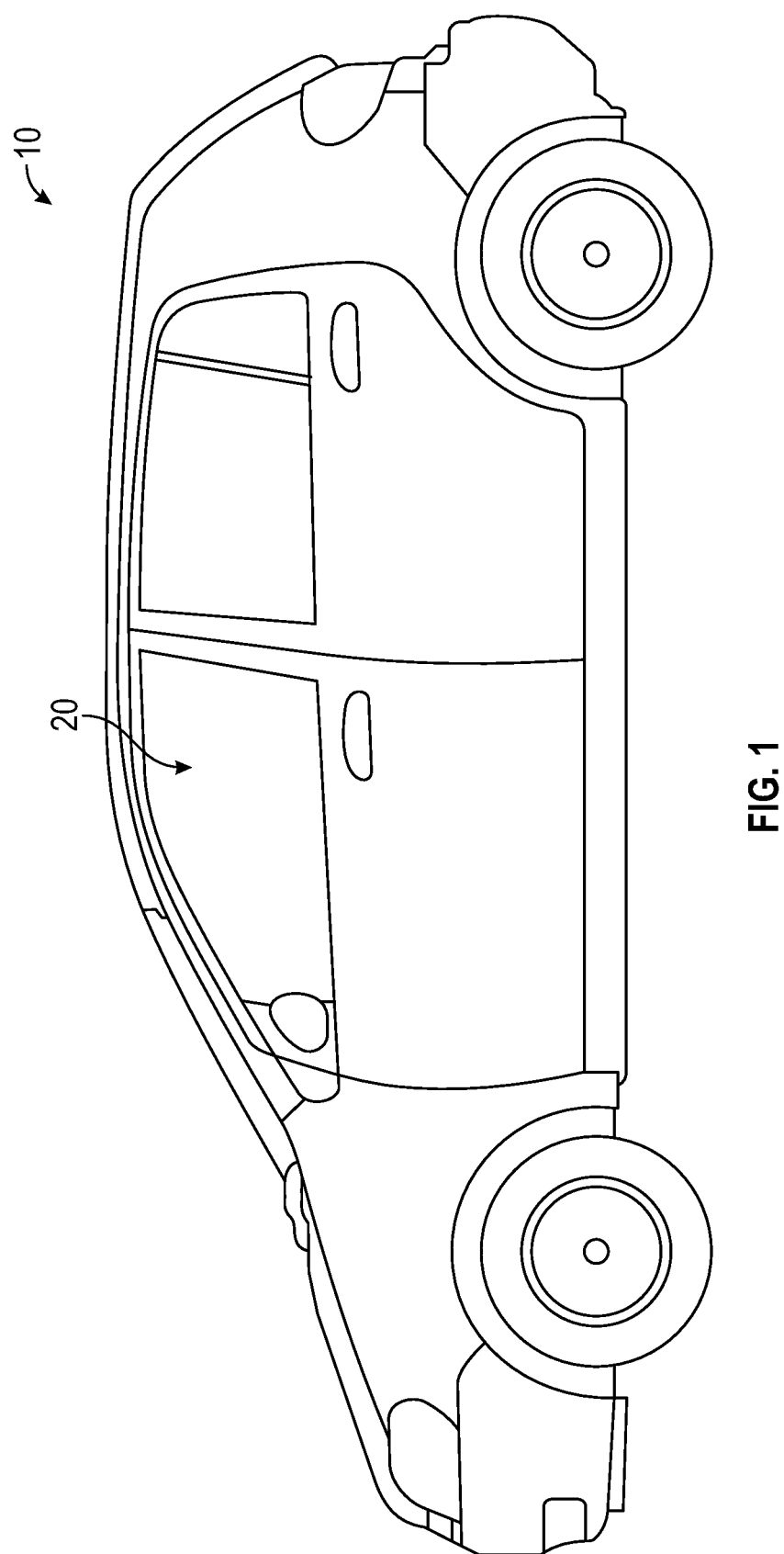
FIG. 1 is a side view of a vehicle, according to an exemplary embodiment.
Figure 2:
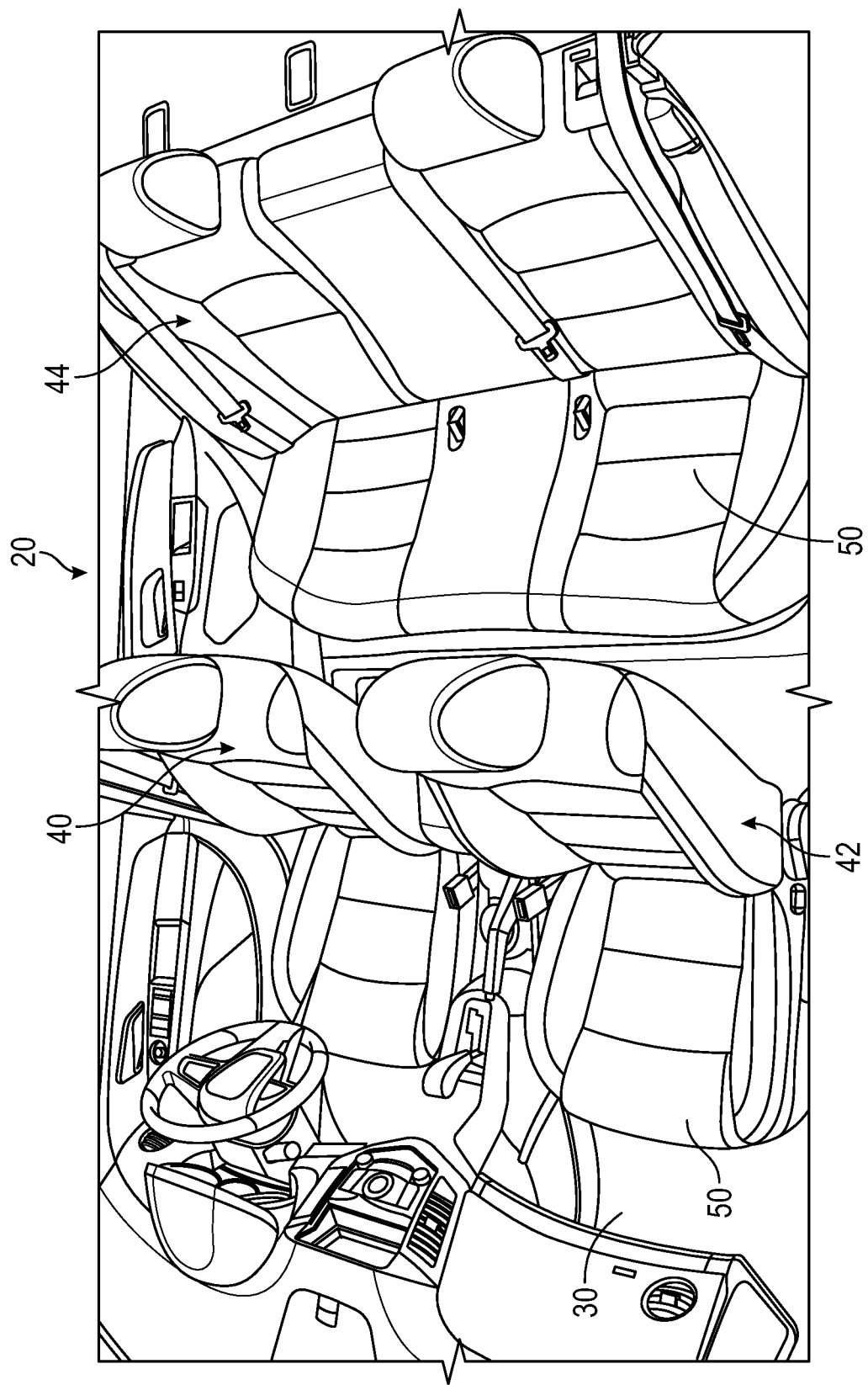
FIG. 2 is a perspective view of a cabin of the vehicle of FIG. 1 including a seat, according to an exemplary embodiment.

As shown in FIGS. 1 and 2, a vehicle 10 includes an interior cabin, shown as passenger cabin 20. In one embodiment, the vehicle 10 is configured as an on-road vehicle such as a sedan, a sport utility vehicle ("SUV"), a pickup truck, a van, or still another type of passenger vehicle. In other embodiments, the vehicle 10 is configured as another type of on-road vehicle such as a semi-truck, a bus, or the like. In still other embodiments, the vehicle 10 is configured as an off-road vehicle such as construction machinery, farming machinery, or the like.

As shown in FIG. 2, the passenger cabin 20 includes a support surface, shown as cabin floor 30, that supports one or more seating assemblies, shown as seats 40, including one or more first seating assemblies, shown as front seats 42, and one or more second seating assemblies, shown as rear seats 44. In some embodiments, the front seats 42 are different than the rear seats 44. In other embodiments, the front seats 42 and the rear seats 44 are the same or utilize similar components (e.g., to facilitate increased scaling for manufacturing and, therefore, a reduction in production costs). By way of example, the front seats 42 and the rear seats 44 may utilize a similar track assembly, however, the track assembly for one of the front seats 42 or the rear seats 44 may include one or more additional components (e.g., for added strength, to meet or exceed industry standards, etc.). In some embodiments, the passenger cabin 20 does not include the rear seats 44. In some embodiments, the passenger cabin 20 only includes a single front seat 42.

Figure 3:
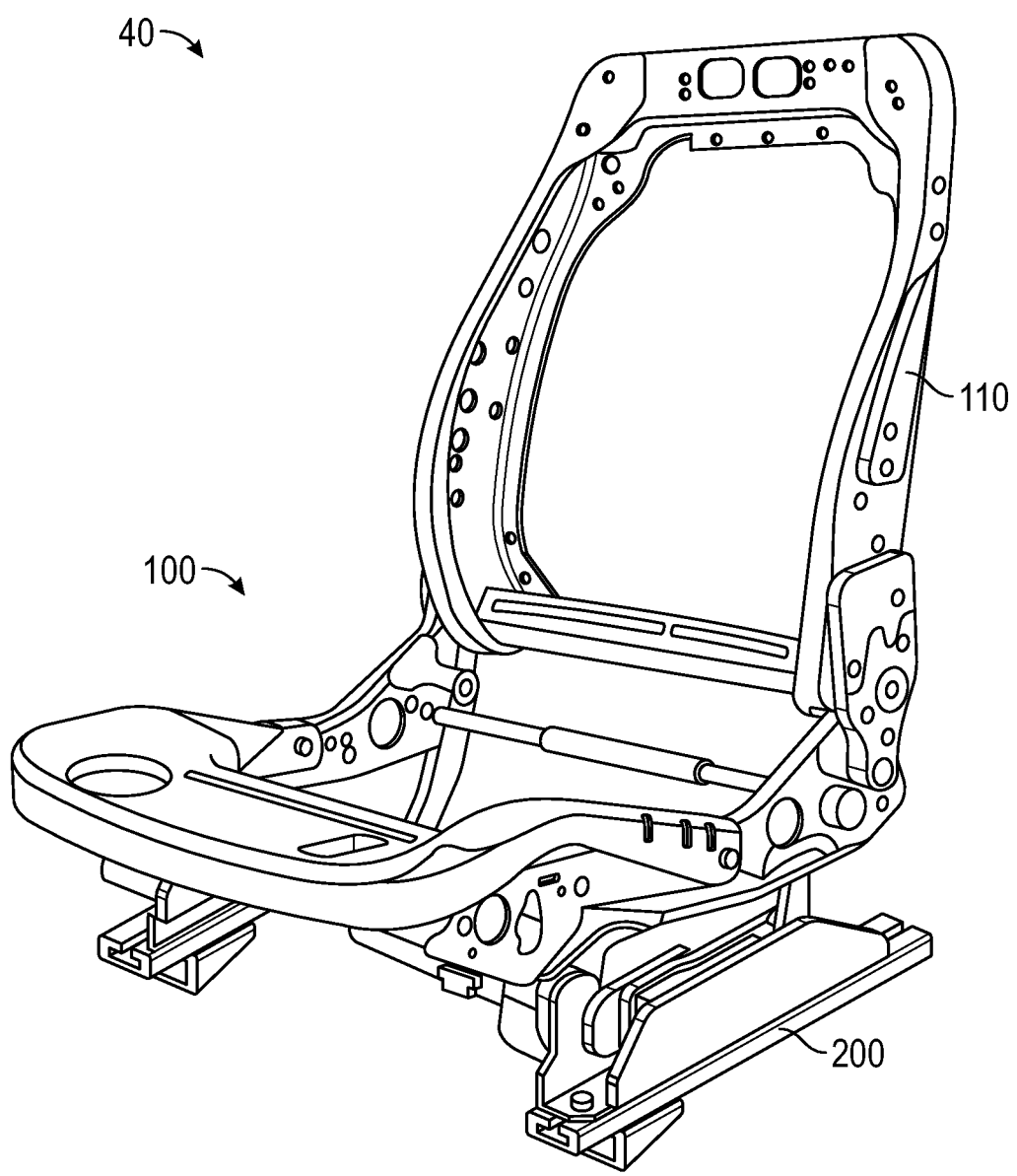
FIG. 3 is a perspective view of a frame assembly of the seat of FIG. 2 including a seat frame assembly and a track assembly, according to an exemplary embodiment.

As shown in FIGS. 2 and 3, each of the seats 40 includes a plurality of padded components (e.g., a seat back pad or cushion, a seat bottom pad or cushion, etc.), shown as seat cushions 50, and a framing assembly, shown as frame assembly 100. As shown in FIG. 3, the frame assembly 100 includes (i) a first frame portion, shown as seat frame assembly 110, configured to support the seat cushions 50 and (ii) a second frame portion, shown as track assembly 200, configured to support and couple to the seat frame assembly 110 and, thereby, couple the seat 40 to the cabin floor 30. According to an exemplary embodiment, the track assembly 200 is adjustable (e.g., manually adjustable, electronically adjustable, etc.) such that the position of the seat 40 can be selectively adjusted (e.g., the seat 40 can be slid forward, rearward, etc.).

Figure 4:
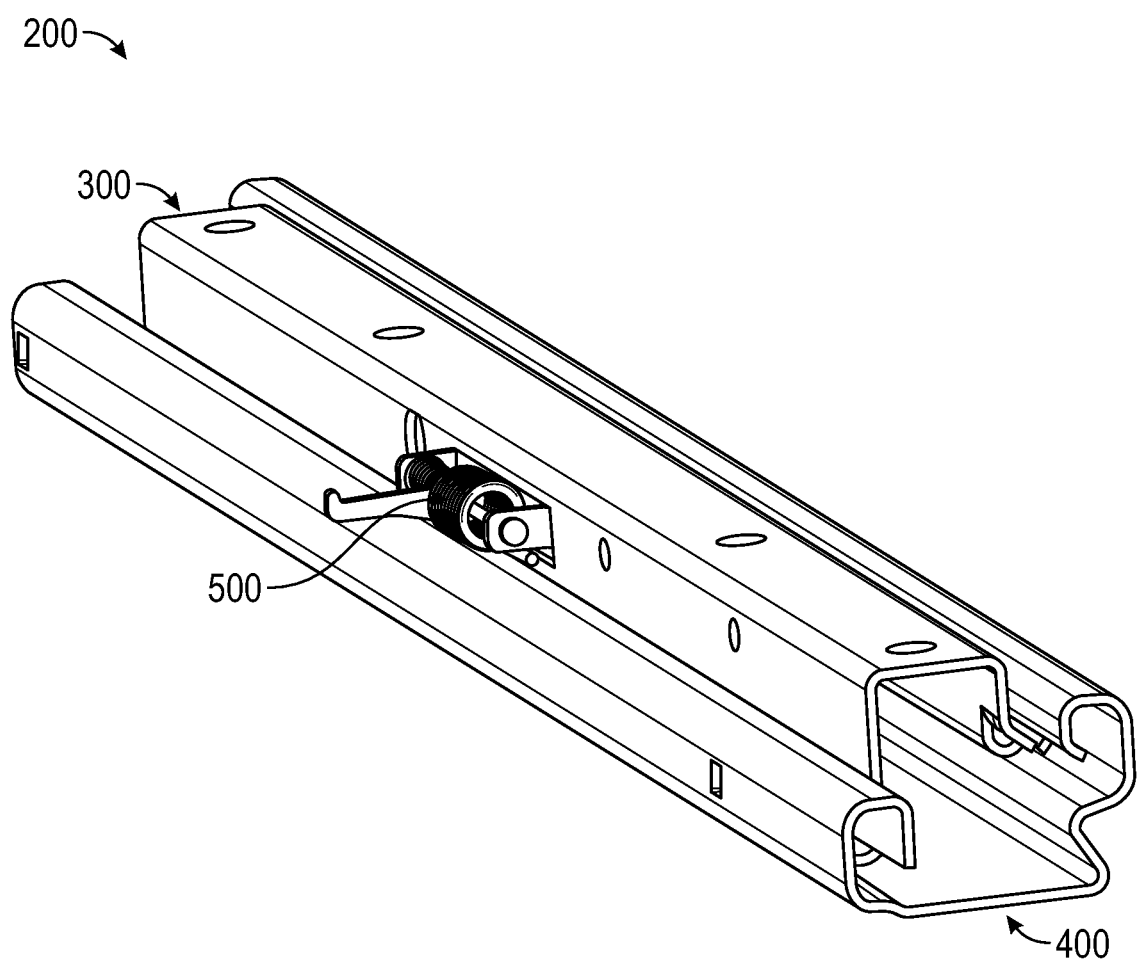
FIGS. 4 and 5 are various detailed perspective views of the track assembly of FIG. 3 including an upper rail, a lower rail, and a latch assembly, according to an exemplary embodiment.
Figure 5:
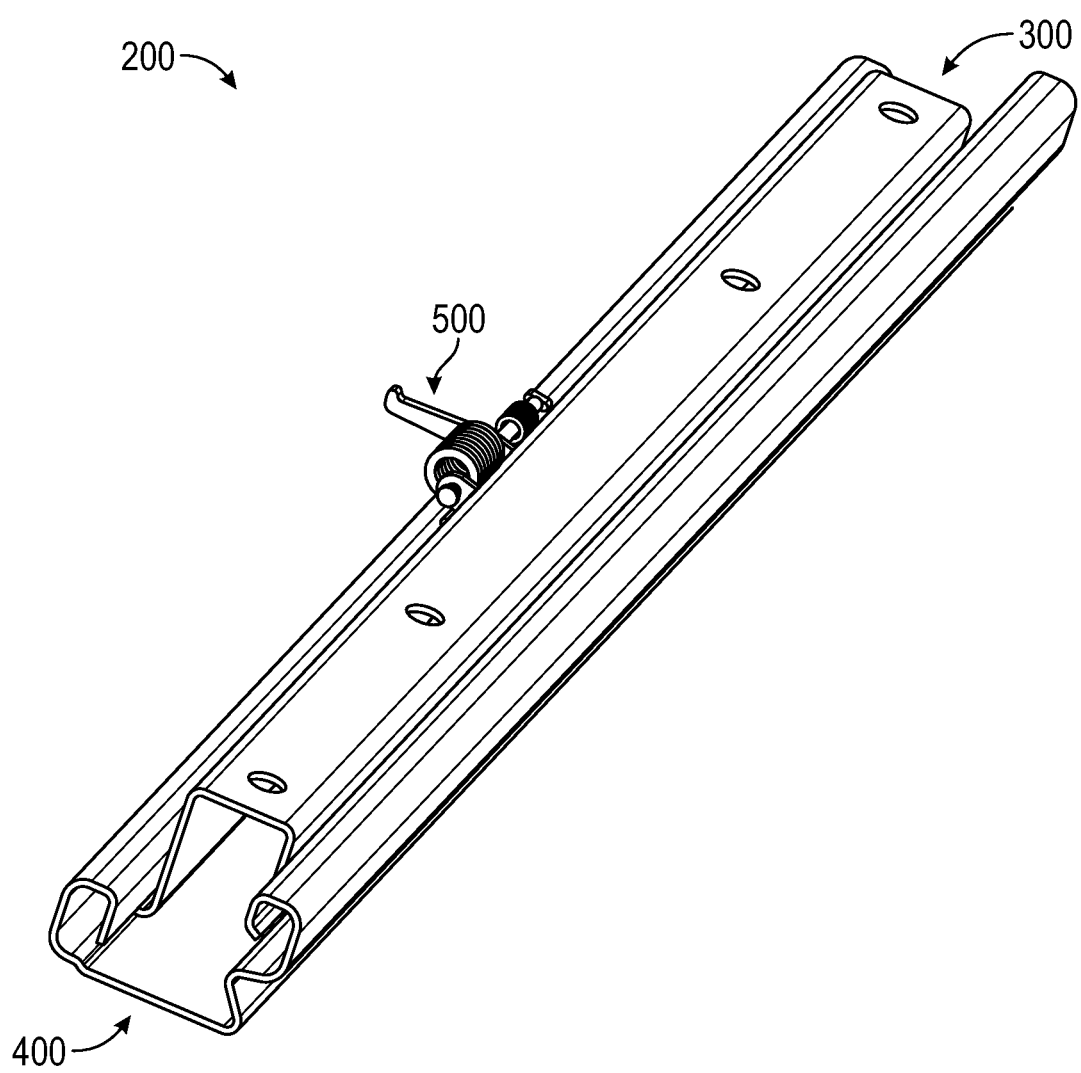

As shown in FIGS. 4 and 5, the track assembly 200 includes a first track, shown as upper rail 300, a second track, shown as lower rail 400, and a securing mechanism, shown as latch assembly 500. According to an exemplary embodiment, the latch assembly 500 is configured to selectively secure or lock the upper rail 300 in a desired position along the lower rail 400 and prevent relative movement therebetween.

Figure 6:
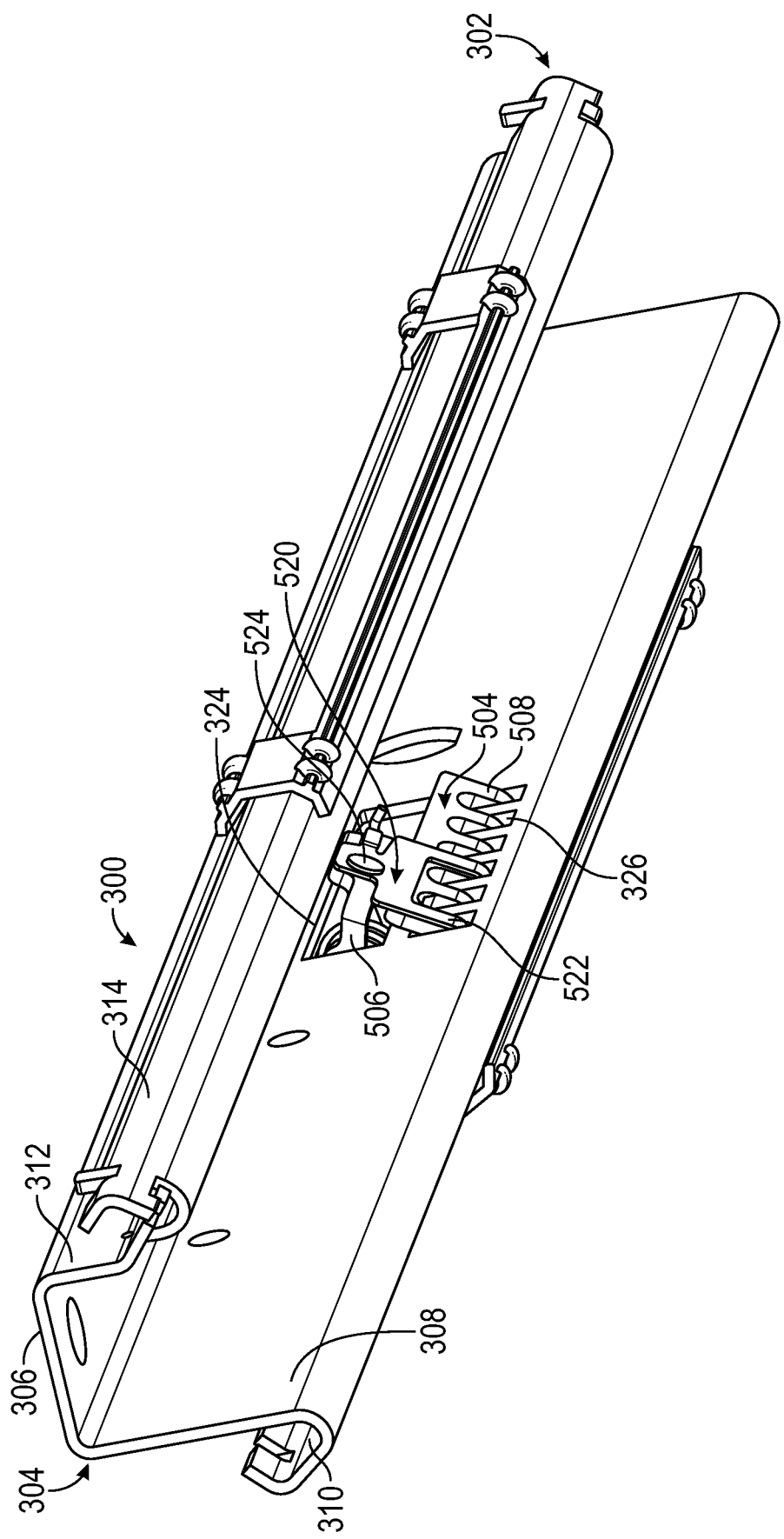
FIGS. 6 and 7 are detailed perspective views of the upper rail and the latch assembly of FIGS. 4 and 5, according to an exemplary embodiment.
Figure 7:
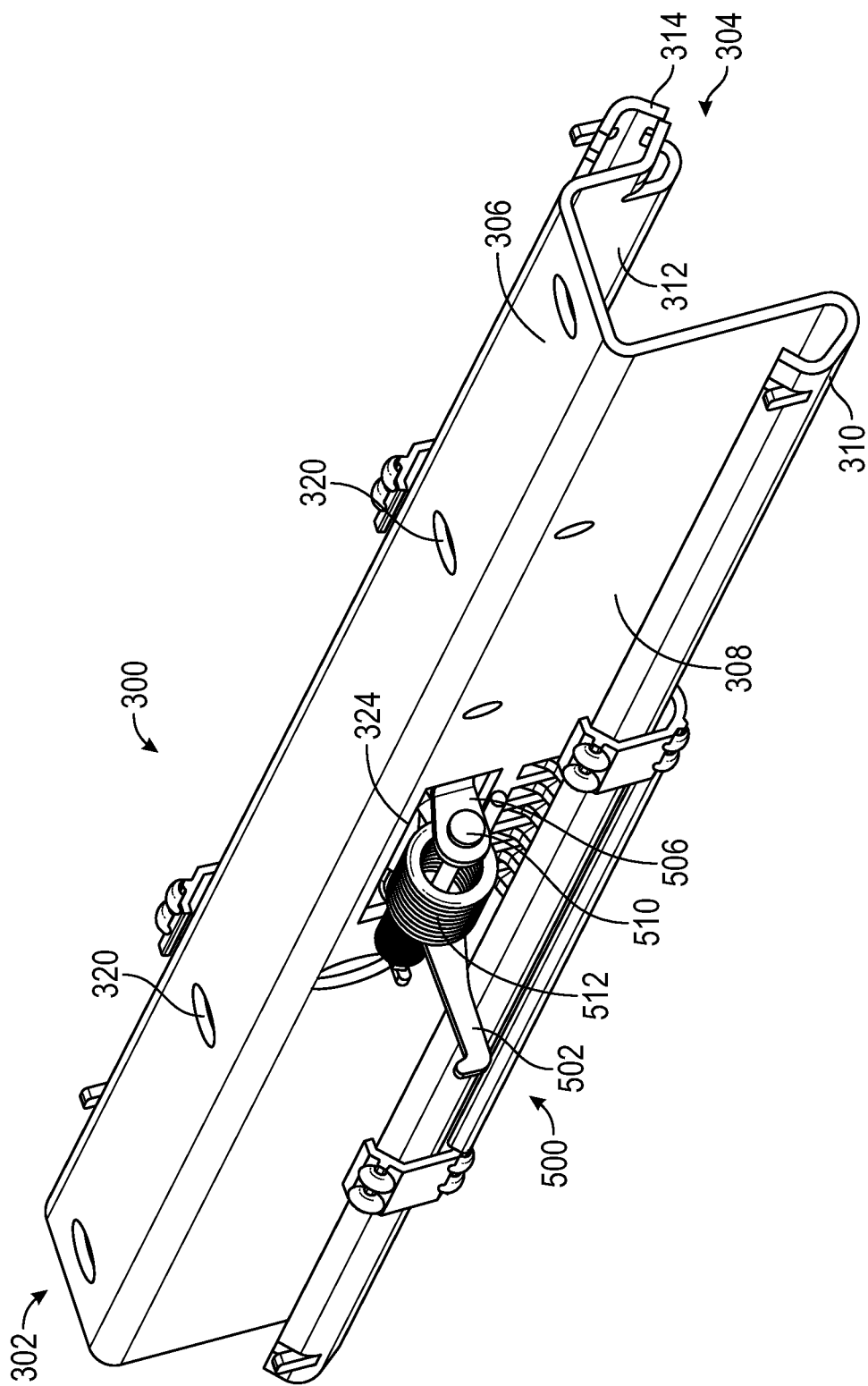
Figure 8:
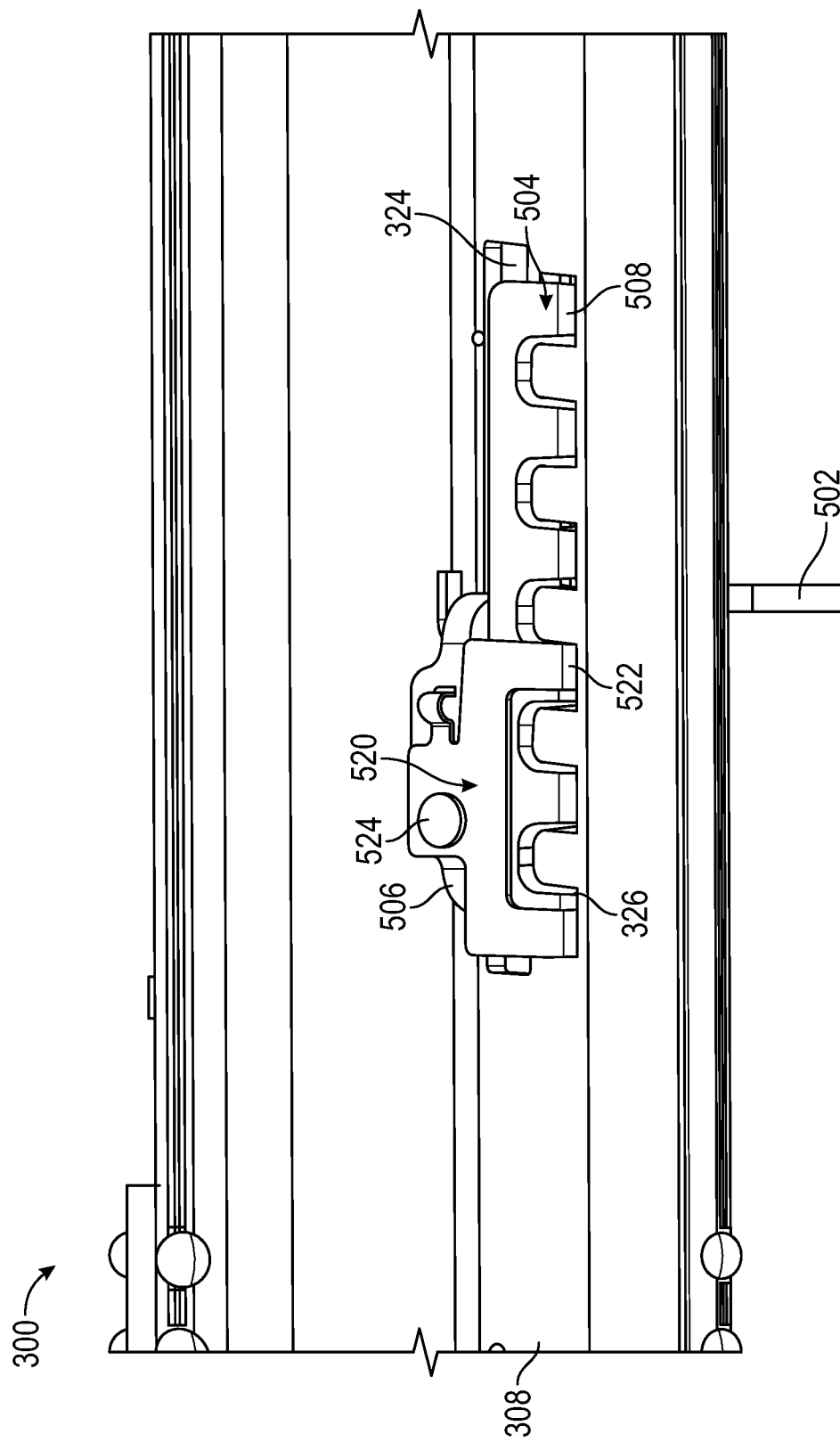
FIG. 8 is a detailed interior view of the latch assembly coupled to the upper rail, according to an exemplary embodiment.

As shown in FIGS. 6-8, the upper rail 300 has (i) a first end, shown as end 302, and an opposing second end, shown as end 304, that are spaced longitudinally apart and (ii) a cross-sectional profile defined by (a) a first wall, shown as top wall 306, (b) a second wall, shown as first sidewall 308, extending downward from a first side of the top wall 306 and terminating with a first lip, shown as first flange 310, and (c) a third wall, shown as second sidewall 312, extending downward from an opposing second side of the top wall 306 and terminating with a second lip, shown as second flange 314. According to the exemplary embodiment shown in FIGS. 6 and 7, the first sidewall 308 is longer or taller than the second sidewall 312 such that the cross-sectional profile is non-uniform or non-symmetrical (e.g., an "r" shaped profile, etc.). In other embodiments, the cross-sectional profile is uniform or symmetrical.

Figure 9:
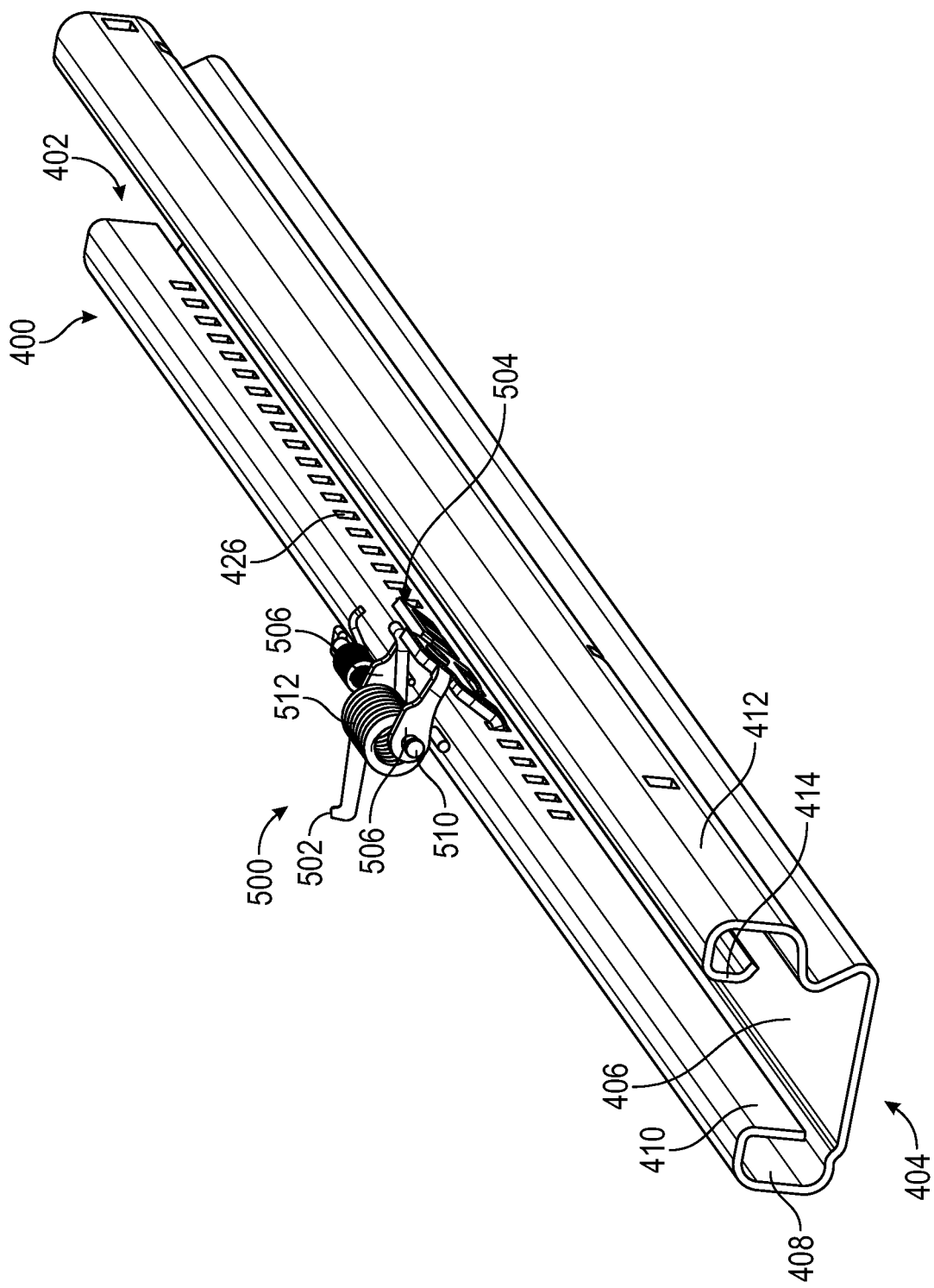
FIGS. 9 and 10 are detailed perspective views of the lower rail and the latch assembly of FIGS. 4 and 5, according to an exemplary embodiment.
Figure 10:
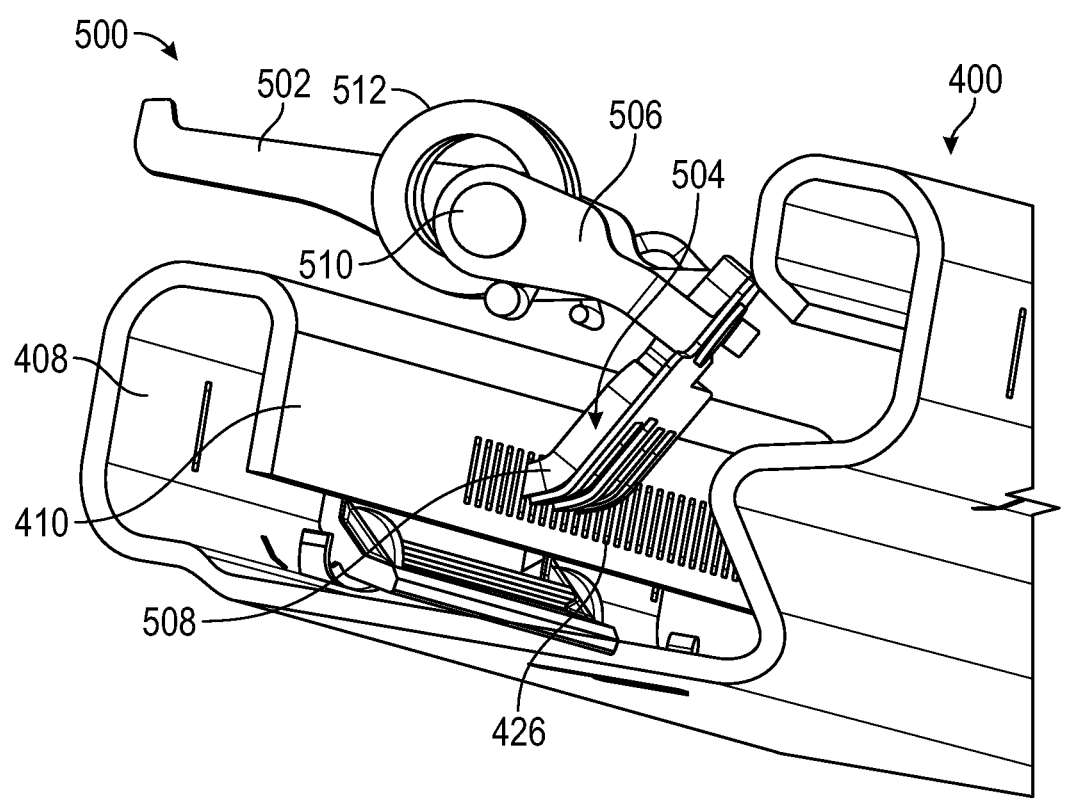

As shown in FIGS. 9 and 10, the lower rail 400 has (i) a first end, shown as end 402, and an opposing second end, shown as end 404, that are spaced longitudinally apart and (ii) a cross-sectional profile defined by (a) a first wall, shown as bottom wall 406, (b) a second wall, shown as first sidewall 408, extending upward from a first side of the bottom wall 406 and terminating with a first lip, shown as first flange 410, and (c) a third wall, shown as second sidewall 412, extending upward from an opposing second side of the bottom wall 406 and terminating with a second lip, shown as second flange 414. According to the exemplary embodiment shown in FIGS. 9 and 10, the second sidewall 412 is longer or taller than the first sidewall 408 such that the cross-sectional profile is non-uniform or non-symmetrical. In other embodiments, the cross-sectional profile is uniform or symmetrical.

Figure 11:
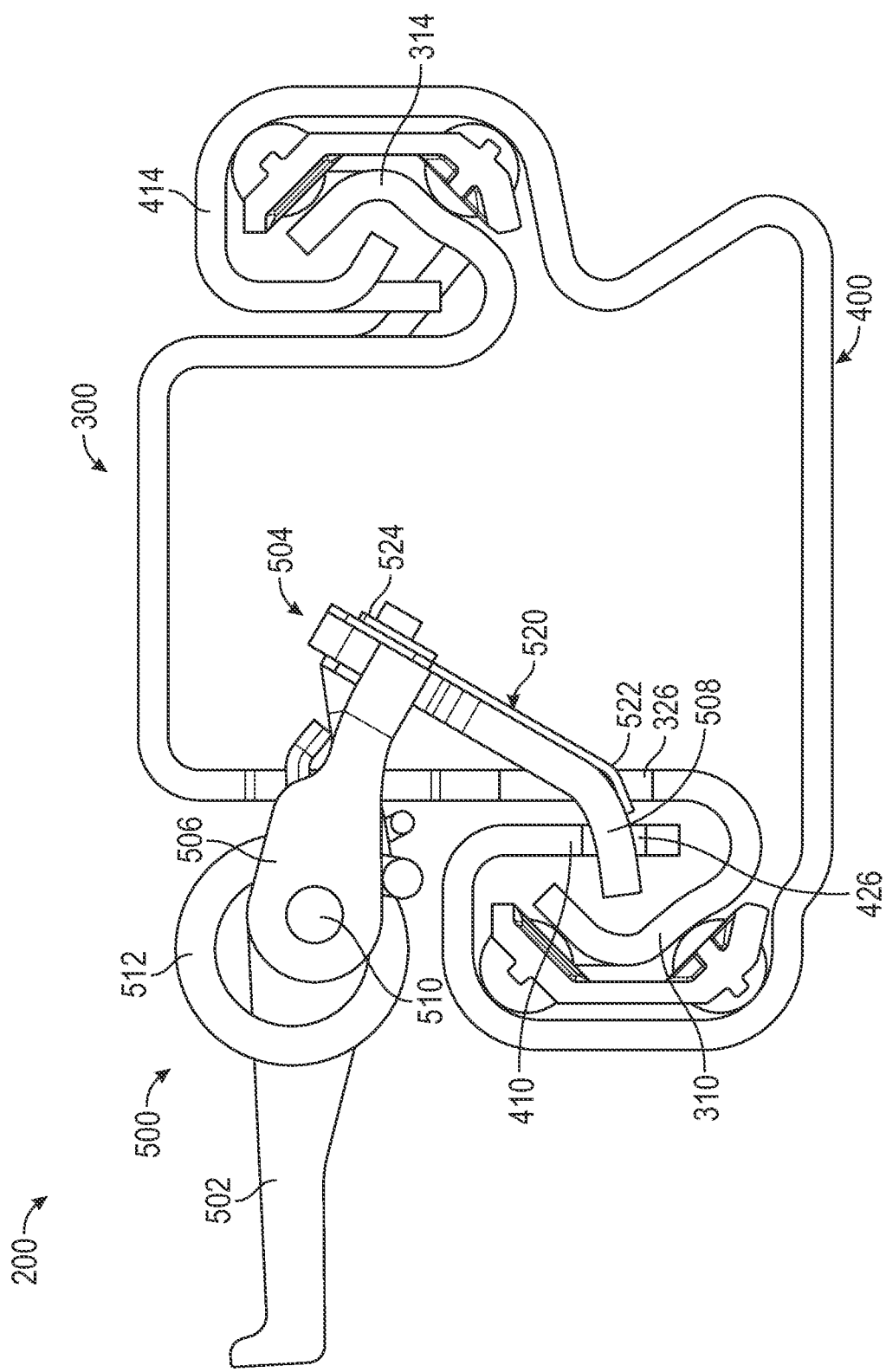
FIGS. 11-14 are various detailed views of the latch assembly securing the upper rail and the lower rail relative to each other, according to an exemplary embodiment.
Figure 12:
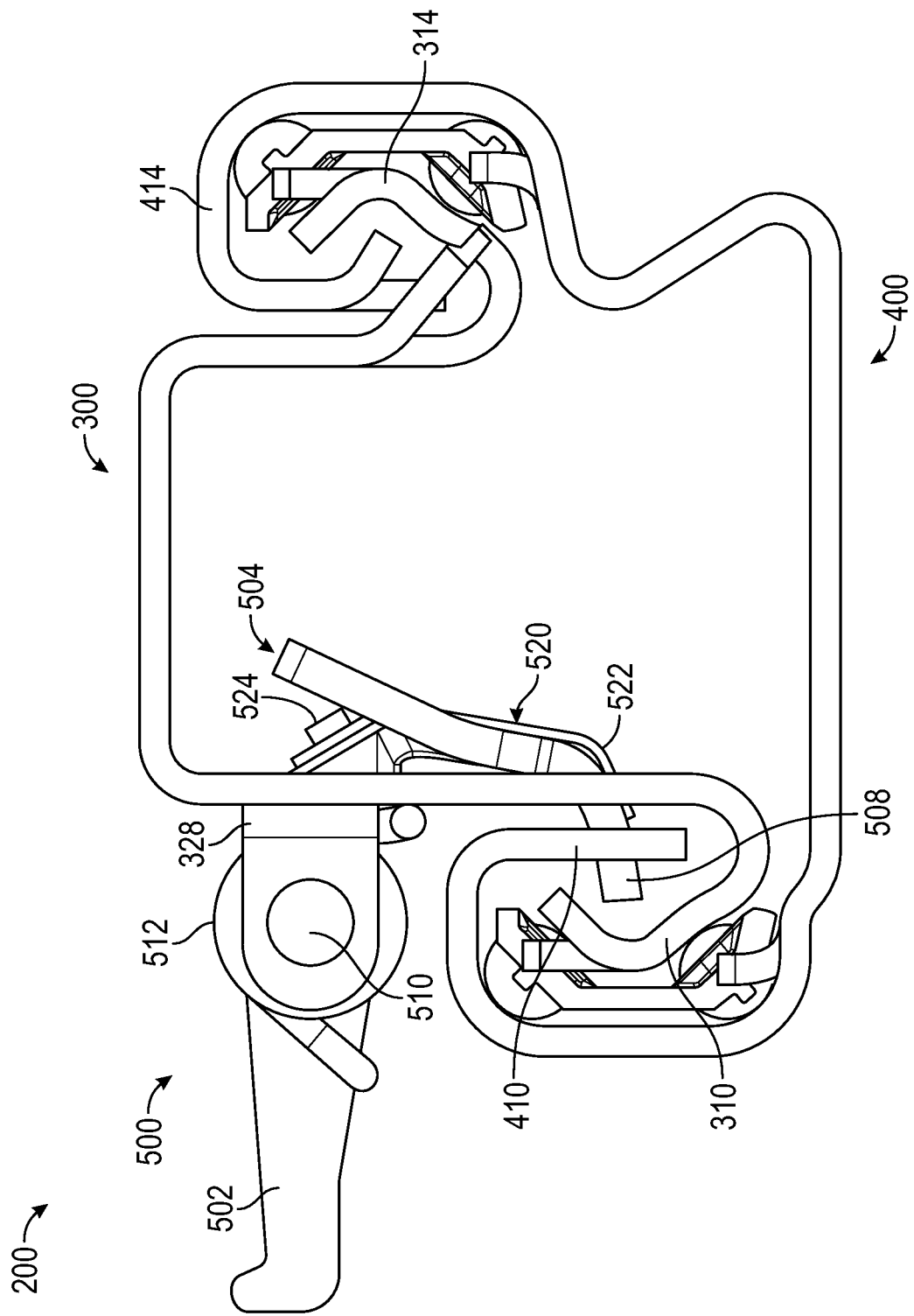
Figure 13:
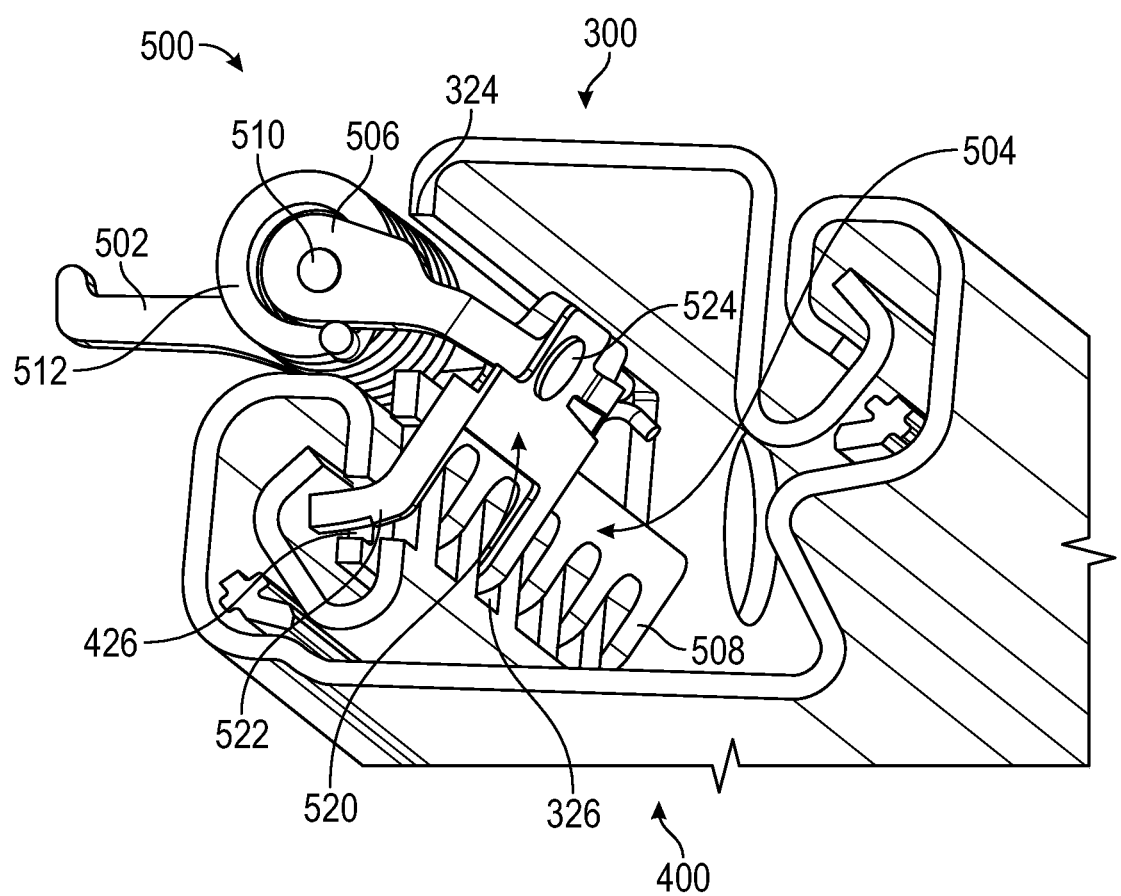
Figure 14:
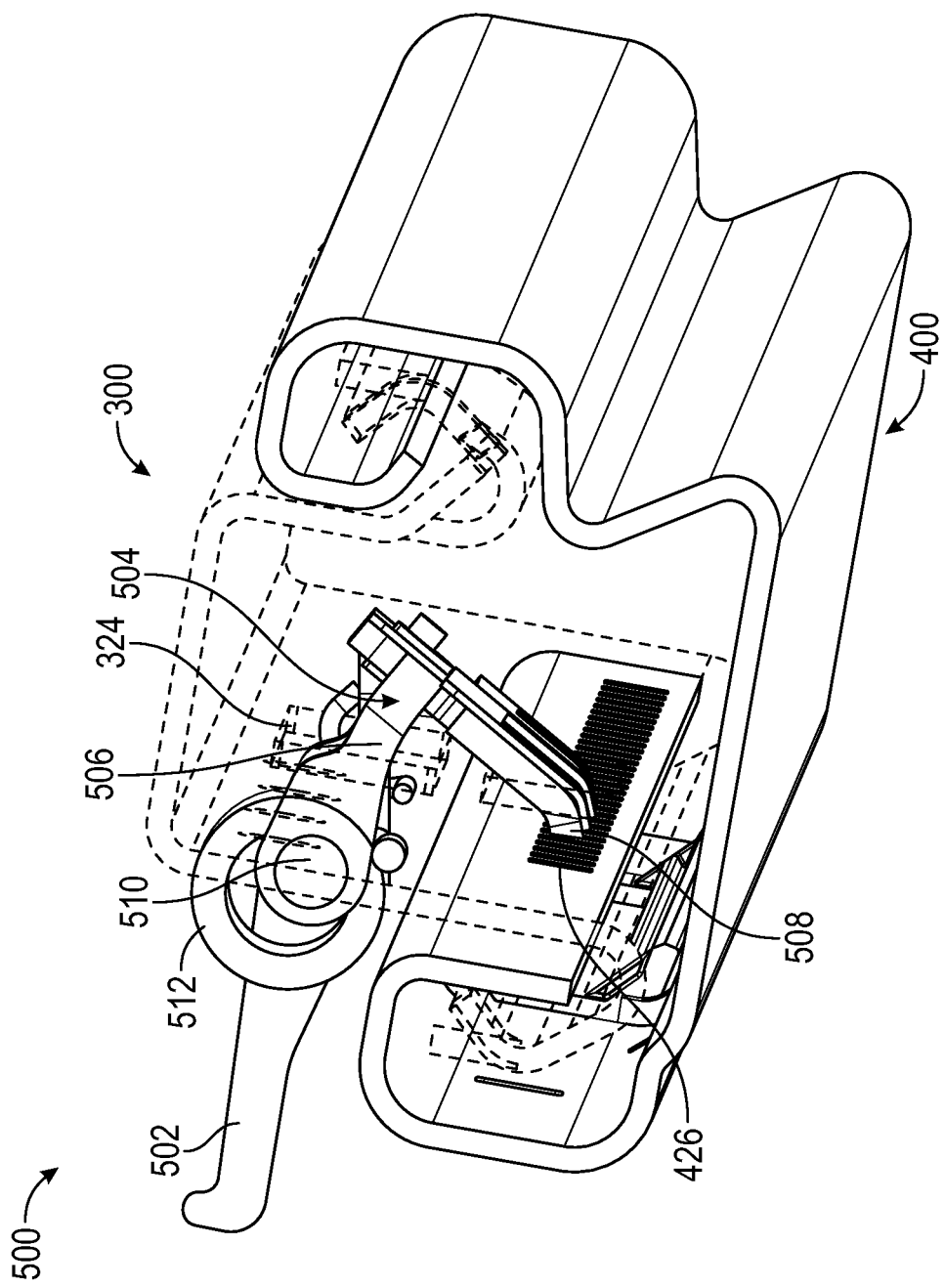

As shown in FIGS. 11-13, (i) the first flange 410 of the lower rail 400 slidably receives the first flange 310 of the upper rail 300 and (ii) the second flange 414 of the lower rail 400 slidably receives the second flange 314 of the upper rail 300 to slidably couple the upper rail 300 to the lower rail 400. As shown in FIG. 7, the top wall 306 of the upper rail 300 defines a plurality of apertures, shown as attachment apertures 320. According to an exemplary embodiment, the attachment apertures 320 are configured to facilitate coupling the upper rail 300, and thereby the track assembly 200, to the seat frame assembly 110 of the frame assembly 100 of the seat 40 using fasteners (e.g., bolts, screws, rivets, etc.). In other embodiments, the upper rail 300 is welded or otherwise coupled to the seat frame assembly 110. According to an exemplary embodiment, the bottom wall 406 of the lower rail 400 defines a plurality of apertures (e.g., similar to the attachment apertures 320). The plurality of apertures of the bottom wall 406 are configured to facilitate coupling the lower rail 400, and thereby the seat 40, to the cabin floor 30 of the vehicle 10.

As shown in FIGS. 6-8 and 13-15, the first sidewall 308 of the upper rail 300 defines a cutout, shown as latch assembly slot 324, positioned between the end 302 and the end 304 thereof (e.g., proximate a midpoint therebetween, etc.) and configured to receive a portion of the latch assembly 500. As shown in FIGS. 6-15, (i) the first sidewall 308 of the upper rail 300 defines a first plurality of apertures or slots, shown as retention slots 326, positioned beneath the latch assembly slot 324 and (ii) the first flange 410 of the lower rail 400 defines a second plurality of apertures or slots, shown as retention slots 426. According to the exemplary embodiment shown in FIGS. 6-15, the upper rail 300 defines a first quantity of the retention slots 326 (e.g., between one and ten slots, between two and eight slots, three slots, four slots, five slots, six slots, etc.) and the lower rail 400 defines a second quantity of the retention slots 426 (e.g., between two and forty slots, five slots, ten slots, fifteen slots, twenty slots, twenty-five slots, thirty slots, etc.) where the first quantity is less than the second quantity. According to an exemplary embodiment, the retention slots 326 of the upper rail 300 are configured to slidably align with at least a subset of the retention slots 426 of the lower rail 400. As described in greater detail herein, when the position of the upper rail 300 is in a desired position along the lower rail 400 and when the retention slots 326 align with a subset of the retention slots 426, the latch assembly 500 is configured to engage with the retention slots 326 and the subset of the retention slots 426 to facilitate securing the upper rail 300 in the desired position and prevent relative movement between the upper rail 300 and the lower rail 400.

As shown in FIGS. 6-15, the latch assembly 500 includes (i) an actuator, shown as lever arm 502, and (ii) a locking fixture, shown as latch plate 504, coupled to the lever arm 502 with a pin, shown as latch pivot pin 510. As shown in FIGS. 6-15, the latch plate 504 includes a pair of connectors, shown as latch plate arms 506, that extend from the latch plate 504, through the latch assembly slot 324, and engage with the latch pivot pin 510 to couple the latch plate 504 to the lever arm 502. In one embodiment, the lever arm 502 is an extension of one of the latch plate arms 506. As shown in FIGS. 6, 8, and 10-15, the latch plate 504 includes a plurality of projections, shown as latch teeth 508.

Figure 15:
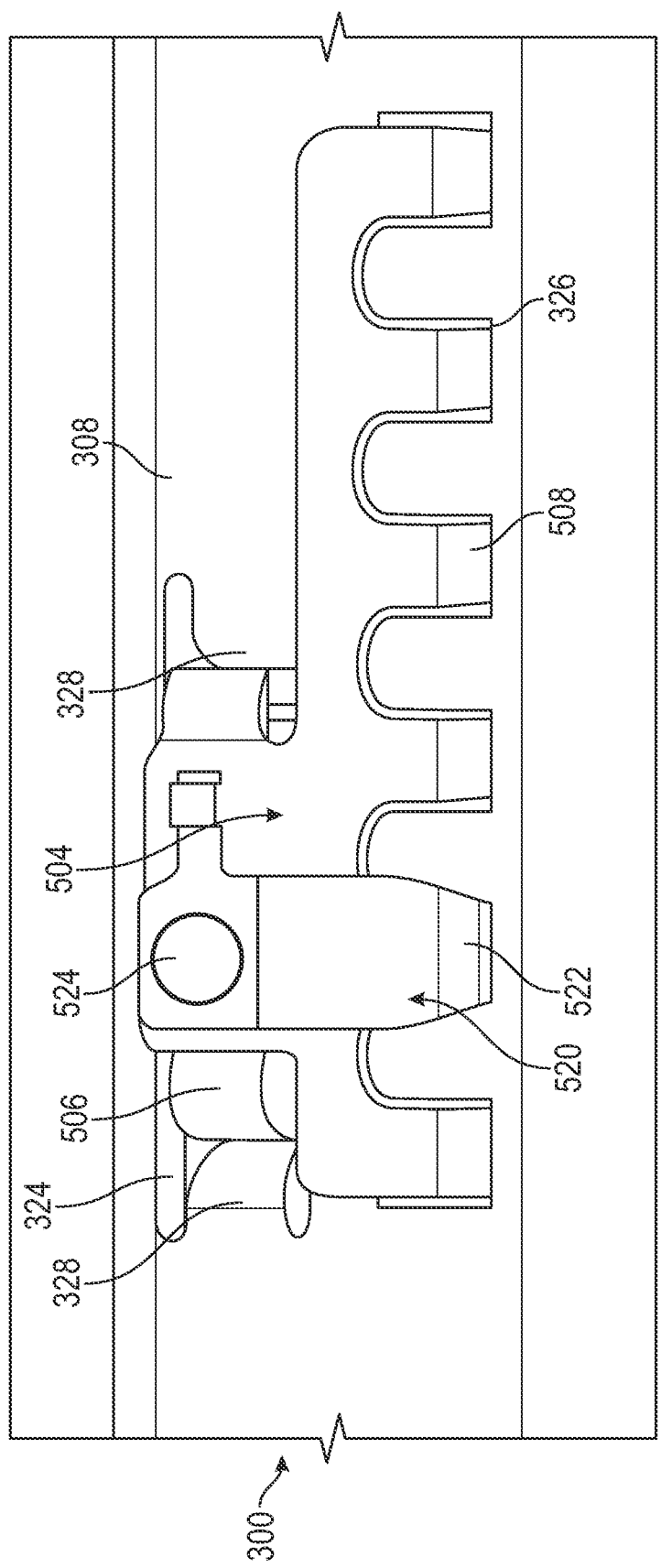
FIG. 15 is a detailed interior view of the latch assembly coupled to the upper rail, according to another exemplary embodiment.

As shown in FIGS. 12 and 15, the first sidewall 308 of the upper rail 300 includes a pair of supports, shown as latch flanges 328, positioned at opposing ends of the latch assembly slot 324 and extending outward from the first sidewall 308 of the upper rail 300. As shown in FIG. 12, the latch pivot pin 510 interfaces with the latch flanges 328 to pivotally mount the latch assembly 500 to the upper rail 300. Accordingly, manipulation of the lever arm 502 causes the latch plate 504 to pivot about the latch pivot pin 510 and relative to the upper rail 300.

As shown in FIGS. 7 and 9-14, the latch assembly 500 includes a biasing element (e.g., a torsion spring, etc.), shown as latch return spring 512. According to an exemplary embodiment, actuating the lever arm 502 contracts the latch return spring 512 and pivots the latch plate 504 about the latch pivot pin 510 from (i) an engaged or locked position (as shown in FIGS. 6 and 8-15) where relative movement between the upper rail 300 and the lower rail 400 is limited or prevented to (ii) a disengaged or unlocked position where relative movement between the upper rail 300 and the lower rail 400 is permitted (e.g., when the latch teeth 508 are disengaged from at least one of the retention slots 326). When the lever arm 502 is released, the latch return spring 512 is configured to bias the latch plate 504 to pivot about the latch pivot pin 510 back to the engaged or locked position. While the latch assembly 500 is shown as including a manual actuator, in other embodiments, the latch assembly 500 additionally or alternatively includes an electronically-controllable actuator (e.g., a motor, a pneumatic actuator driven by an electronic pump, etc.) positioned to pivot the latch plate 504 about the latch pivot pin 510.

As shown in FIGS. 6 and 8-15, the latch teeth 508 of the latch plate 504 extend through the retention slots 326 of the upper rail 300 and a subset of the retention slots 426 of the lower rail 400 when the latch plate 504 is in the engaged or locked position to substantially fix the positions of the upper rail 300 and the lower rail 400 relative to each other and prevent movement therebetween. However, as shown in FIGS. 8 and 15, the latch teeth 508 are sized or shaped (e.g., undersized, tapered, etc.) such that there is a clearance gap between the lateral edges of the latch teeth 508 and the sides of the retention slots 326 of the upper rail 300 when the latch teeth 508 engage with the retention slots 326. For example, a longitudinal width of each of the retention slots 326 (e.g., a width of the slots extending between the end 302 and the end 304) is greater than or equal to a corresponding longitudinal width of each of the latch teeth 508. As another example, a shape of each latch teeth 508 (e.g., a tapered shape) creates a gap between each of the latch teeth 508 and each of the retention slots 326. Such clearance gaps can cause looseness in the track assembly 200, which can allow minor movement between the latch assembly 500 and the upper rail 300 (e.g., under loading conditions, during baking, during acceleration, etc.) and cause wear or noise, which is commonly referred to as "chuck."

As shown in FIGS. 6, 8, and 11-15, the latch assembly 500 includes an anti-chuck mechanism or component (e.g., an anti-chuck plate having one or more anti-chuck or spring teeth), shown as anti-chuck leaf spring 520, coupled to the latch plate 504 with a fastener, shown as rivet 524, to eliminate the "chuck." In another embodiment, another type of fastener is used (e.g., a bolt, etc.). As shown in FIGS. 6 and 8, the anti-chuck leaf spring 520 has a pair of projections or anti-chuck teeth, shown as spring teeth 522. As shown in FIG. 15, the anti-chuck leaf spring 520 includes a single spring tooth 522. In other embodiments, the anti-chuck leaf spring 520 includes more than two spring teeth 522 (e.g., three, four, five, six, up to the same number as the number of latch teeth 508, etc.).

As shown in FIGS. 6, 8, and 11-15, the anti-chuck leaf spring 520 and the spring teeth 522 extend along the latch plate 504 and the latch teeth 508 (e.g., along an exterior face or surface thereof). Each tooth of the spring teeth 522 is configured (e.g., positioned, shaped, sized, etc.) to engage with one or both of the sides of a respective one of the retention slots 326 of the upper rail 300 associated therewith when the latch plate 504 is in the engaged or locked position. According to the exemplary embodiment shown in FIG. 8, each of the spring teeth 522 extends laterally past/beyond at least one edge of a respective one of the latch teeth 508 that is associated therewith to engage with at least one of the sides of a respective one of the retention slots 326. Specifically, as shown in FIG. 8, (i) a first spring tooth 522 extends past a first edge of a first latch tooth 508 of the latch plate 504 and does not extend past an opposing second edge of the first latch tooth 508 and (ii) a second spring tooth 522 extends past the opposing second edge of a second latch tooth 508 and does not extend past the first edge of the second latch tooth 508, and the first spring tooth 522 and the second spring tooth 522 are not positioned along adjacent latch teeth 508, but at least one latch tooth 508 is positioned therebetween. According to the exemplary embodiment shown in FIG. 15, the spring tooth 522 extends laterally past/beyond both edges of a respective one of the latch teeth 508 that is associated therewith to engage with both sides of a respective one of the retention slots 326. Such engagement between the retention slots 326 and the spring teeth 522 under the spring load of the latch return spring 512 causes each of the spring teeth 522 to deflect or otherwise deform and close one or more of the clearance gaps, providing an anti-chuck function to eliminate the "chuck." According to the exemplary embodiment shown in FIGS. 11-13, the spring teeth 522 deflect and engage with the retention slots 326 of the upper rail 300 while still permitting the latch teeth 508 to fully extend through the retention slots 426 of the lower rail 400.

In one embodiment, the anti-chuck leaf spring 520 is manufactured from spring steel. In another embodiment, the anti-chuck leaf spring 520 is manufactured from a plastic material. In still another embodiment, the anti-chuck leaf spring 520 is manufactured from an at least partially compliant, pliable, malleable, or deformable material that can deflect or otherwise deform to provide the anti-chuck function described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat 40 and components thereof (e.g., the frame assembly 100, the track assembly 200, etc.) as shown in the various exemplary embodiments is illustrative only. Additionally, any element disclosed in one embodiment may be incorporated or utilized with any other embodiment disclosed herein.

The invention claimed is:

1. A track assembly for mounting a seat within a vehicle, the track assembly comprising:
a first track having a plurality of first apertures;
a second track having a plurality of second apertures; and
a latch assembly including:
a latch plate repositionable between an engaged position and a disengaged position, the latch plate including a plurality of first teeth that selectively extend through the plurality of first apertures and through a subset of the plurality of second apertures when the latch plate is in the engaged position, wherein a gap is present between one of the plurality of first teeth and a side of one of the plurality of first apertures when the latch plate is in the engaged position; and
an anti-chuck component coupled to the latch plate, the anti-chuck component including a leaf spring, wherein the leaf spring has a tooth that engages a portion of the side of the one of the plurality of first apertures to close the gap when the latch plate is in the engaged position, wherein the tooth of the leaf spring is configured to at least partially deform when engaged with the side of the one of the plurality of first apertures.

2. The track assembly of claim 1, wherein the latch assembly is configured to secure the first track in a position relative to the second track when the latch plate is in the engaged position.

3. The track assembly of claim 1, wherein:
the first track includes a first end, an opposing second end, and a sidewall extending therebetween; and
the plurality of first apertures are retention slots positioned along the sidewall between the first end and the opposing second end.

4. The track assembly of claim 3, wherein:
the sidewall includes a latch assembly slot through which at least a portion of the latch assembly extends; and
the latch assembly slot is disposed above at least one of the plurality of first apertures.

5. The track assembly of claim 4, wherein:
the first track includes a flange extending from the sidewall thereof;
the flange is positioned proximate the latch assembly slot; and
the latch assembly is coupled to the flange.

6. The track assembly of claim 1, wherein:
the second track includes a first end, an opposing second end, and a sidewall extending therebetween, wherein the sidewall terminates with a flange;

the plurality of second apertures are retention slots positioned along the flange between the first end and the opposing second end; and
a first quantity of the plurality of first apertures is less than a second quantity of the plurality of second apertures.

7. The track assembly of claim 1, wherein:
the latch assembly includes an actuator operably coupled to the latch plate, the actuator is configured to facilitate pivoting the latch plate between the engaged position and the disengaged position; and
in the disengaged position, the plurality of first teeth do not extend through the subset of the plurality of second apertures such that the first track is moveable relative to the second track.

8. The track assembly of claim 1, wherein:
the one of the plurality of first teeth includes a first width;
the one of the plurality of first apertures includes a second width; and
the second width is greater than the first width.

9. The track assembly of claim 1, wherein the tooth of the leaf spring is the only tooth of the anti-chuck component.

10. The track assembly of claim 1, wherein the tooth of the leaf spring extends along an exterior face of a respective tooth the one of the plurality of first teeth, and wherein the tooth of the leaf spring extends laterally past at least one edge of the one of the plurality of first teeth.

11. The track assembly of claim 10, wherein the tooth of the leaf spring extends laterally past opposing lateral edges of the one of the plurality of first teeth.

12. The track assembly of claim 1, wherein:
the tooth of the spring is a first anti-chuck tooth of a plurality of anti-chuck teeth of the leaf spring;
each of the plurality of anti-chuck teeth extends along an exterior surface of a respective one of the plurality of first teeth;
the plurality of first teeth include at least a first latch tooth, a second latch tooth, and a third latch tooth positioned between the first latch tooth and the second latch tooth;
the first anti-chuck tooth of the plurality of anti-chuck teeth (i) extends laterally past a first edge of the first latch tooth and (ii) does not extend laterally past an opposing second edge of the first latch tooth;
a second anti-chuck tooth of the plurality of anti-chuck teeth (i) extends laterally past a first edge of the second latch tooth and (ii) does not extend laterally past an opposing second edge of the second latch tooth, wherein a lateral distance between the second edge of the first latch tooth and the second edge of the second latch tooth is less than a lateral distance between the first edge of the first latch tooth and the first edge of the second latch tooth; and
none of the plurality of anti-chuck teeth are positioned along the third latch tooth.

13. A track assembly for mounting a seat within a vehicle, the track assembly comprising:
a first track having a plurality of first apertures;
a second track having a plurality of second apertures; and
a latch assembly including:
a latch plate repositionable between an engaged position and a disengaged position, the latch plate including a plurality of first teeth that selectively extend through the plurality of first apertures and through a subset of the plurality of second apertures when the latch plate is in the engaged position, wherein a gap is present between one of the plurality of first teeth and a side of one of the plurality of first apertures when the latch plate is in the engaged position; and
an anti-chuck component coupled to the latch plate, the anti-chuck component including a tooth that engages a portion of the side of the one of the plurality of first apertures to close the gap when the latch plate is in the engaged position, wherein the tooth of the anti-chuck component is configured to at least partially deform when engaged with the side of the one of the plurality of first apertures;
wherein:
the one of the plurality of first teeth includes a first width;
the one of the plurality of first apertures includes a second width;
the second width is greater than the first width;
the tooth of the anti-chuck component includes a third width; and
the third width is greater than or equal to the second width.

14. A vehicle seat comprising:
a seat; and
a track assembly configured to mount the seat to a surface of a vehicle, the track assembly including:
a first track having a plurality of first apertures;
a second track having a plurality of second apertures; and
a latch assembly including:
a latch plate repositionable between an engaged position and a disengaged position, the latch plate including a plurality of first teeth that selectively extend through the plurality of first apertures and through a subset of the plurality of second apertures when the latch plate is in the engaged position, wherein a gap is present between one of the plurality of first teeth and a side of one of the plurality of first apertures when the latch plate is in the engaged position; and
an anti-chuck component coupled to the latch plate, the anti-chuck component including a leaf spring, wherein the leaf spring has a tooth that engages a portion of the side of the respective one of the plurality of first apertures to close the gap when the latch plate is in the engaged position, wherein the tooth of the leaf spring is configured to at least partially deform when engaged with the side of the one of the plurality of first apertures.

15. The vehicle seat of claim 14, wherein the tooth of the leaf spring is one of a plurality of second teeth of the leaf spring, and wherein each of the plurality of second teeth extends along an exterior face of a respective one of the plurality of first teeth.

16. The vehicle seat of claim 15, wherein the plurality of first teeth include a first latch tooth, a second latch tooth, and a third latch tooth positioned between the first latch tooth and the second latch tooth, and wherein none of the plurality of second teeth are positioned along the third latch tooth.

17. The vehicle seat of claim 14, wherein the tooth of the leaf spring extends along an exterior face of the one of the plurality of first teeth, and wherein the tooth of the leaf spring extends laterally past opposing lateral edges of the one of the plurality of first teeth.

18. A track assembly for mounting a seat within a vehicle, the track assembly comprising:
an upper rail having:
a top wall;
a first upper sidewall extending downward from a first side of the top wall and terminating with a first lip, the first upper sidewall defining (i) a latch slot and (ii) a plurality of first apertures positioned beneath the latch slot;

a second upper sidewall extending downward from an opposing second side of the top wall and terminating with a second lip; and a flange extending from the first upper sidewall, the flange positioned proximate the latch slot;

a lower rail having:

a bottom wall;

a first lower sidewall extending upward from a first side of the bottom wall and terminating with a third lip, the third lip defining a plurality of second apertures; and a second lower sidewall extending upward from an opposing second side of the bottom wall and terminating with a fourth lip, wherein the third lip and the fourth lip engage with the first lip and the second lip to slidably couple the lower rail and the upper rail together; and a latch assembly coupled to the flange and extending through the latch slot, the latch assembly including:

a latch plate repositionable between an engaged position and a disengaged position, the latch plate including a plurality of latch teeth that selectively extend through the plurality of first apertures of the first upper sidewall and through a subset of the plurality of second apertures of the third lip when the latch plate is in the engaged position to restrict relative movement between the upper rail and the lower rail; and an anti-chuck plate coupled to the latch plate, the anti-chuck plate including a leaf spring having:

a first anti-chuck tooth that (i) is disposed along a first latch tooth of the plurality of latch teeth, (ii) extends laterally past a first edge of the first latch tooth, and (iii) does not extend laterally past an opposing second edge of the first latch tooth; and a second anti-chuck tooth that (i) is disposed along a second latch tooth of the plurality of latch teeth, (ii) extends laterally past a first edge of the second latch tooth, and (iii) does not extend laterally past an opposing second edge of the second latch tooth.

19. The track assembly of claim 18, wherein a lateral distance between the second edge of the first latch tooth and the second edge of the second latch tooth is less than a lateral distance between the first edge of the first latch tooth and the first edge of the second latch tooth.

* * * * *